UNITED STATES PATENT OFFICE.

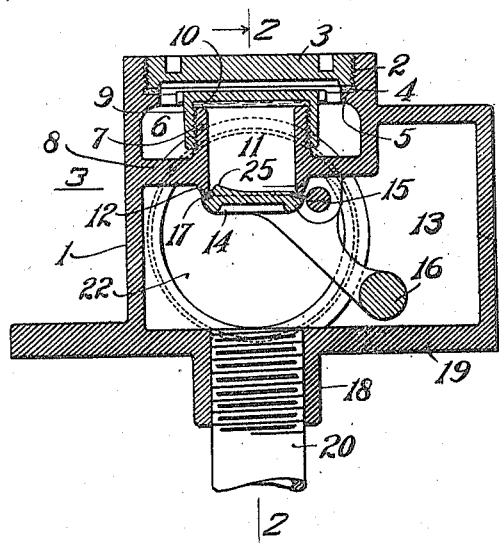
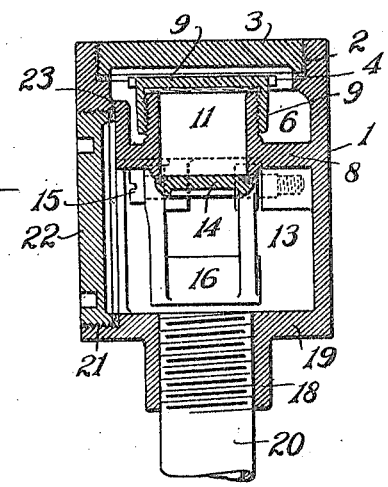
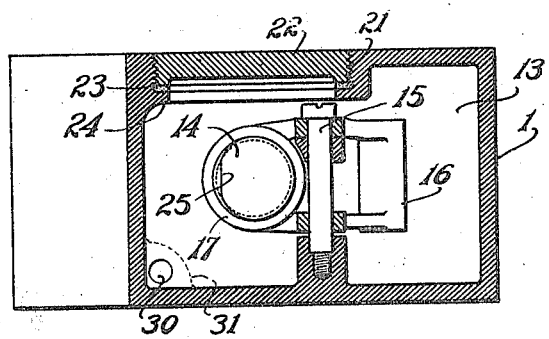

CHARLES L. FRENCH, OF CAMBRIDGE, MASSACHUSETTS.

SAFETY FILLING-TRAP.

1,169,791.  Specification of Letters Patent.  Patented Feb. 1, 1916.

Application filed July 14, 1913. Serial No. 779,042.

*To all whom it may concern:*

Be it known that I, CHARLES L. FRENCH, of Cambridge, in the county of Middlesex and State of Massachusetts, have invented certain new and useful Improvements in Safety Filling-Traps, of which the following is a specification.

This invention relates to automatic safety appliances for filling traps such as are used in connection with underground tanks in which is stored gasolene, naphtha, or the like, and is designed to prevent overfilling or overflowing of the fluid, in cases of neglect or carelessness on the part of the attendant.

As at present constructed, these traps are provided with a screw cap which is supposed to be in place except when the actual operation of gaging the depth of liquid is taking place; but, as this safeguard depends mainly upon the care and attention of the operative, I deem it necessary to provide auxiliary means for automatically preventing overflow, such as will not, in any way, interfere with the legitimate uses of the trap as a whole.

In the accompanying drawings, which form part of this specification and in which I have illustrated one form of my invention, Figure 1 is a vertical, central section of a filling trap equipped with my invention. Fig. 2 is a vertical central section on line 2—2 of Fig. 1. Fig. 3 is a plan section on line 3—3 of Fig. 1.

The box or frame 1 has, at the top, a threaded socket 2 adapted to receive the plug 3, which is seated against a packing washer 4 on the shelf 5. Below plug 3, box 1 incloses a chamber 6 containing a threaded nipple 7, integral with the floor 8 of chamber 6, which nipple is fitted with a screw cap 9 adapted to seat against a washer 10 on nipple 7.

The central opening 11 of nipple 7 extends through the floor 8 and is terminated in a valve-seat 12 at its lower end. Valve-seat 12 is formed within a second chamber 13 which is adapted to house and completely inclose a weighted valve 14, pivotally mounted within chamber 13 at 15. A weight 16, integrally connected with valve 14, is so disposed as to allow gravity to automatically maintain valve 14 against seat 12, except when the gaging operation is being performed. I prefer to face valve 14 with a packing ring 17, of some suitable material, so as to insure a tight closure between valve 14 and seat 12.

At the bottom of box 1 I provide an internally threaded boss 18, arranged vertically beneath opening 11 and formed integral with the base 19 of box 1. To this boss 18 is secured the pipe 20 which communicates with the buried tank, not shown.

At one side of chamber 13 I provide a threaded socket 21 adapted to receive a second plug 22 which seats against a packing washer 23 on the ledge 24. This is for the purpose of assembling valve 14 and is, at all other times, kept closed.

In operation, when it is desired to gage the depth of liquid in the tank, plug 3 and cap 9 are removed and a graduated rod is inserted through the vertical opening that extends completely through box 1 and into pipe 20 to the floor of the tank. This act of insertion forces valve 14 out of the direct path of opening 11, against the action of weight 16. When the rod is withdrawn, this weight compels valve 14 to follow it until the through opening is again closed at the seat 12. As this rod may be of metal construction, I prefer to form an upwardly extending lip 25 on the upper surface of valve 14, so the rod may not contact with the seat of valve 14 and thereby abrade it.

By the use of valve 14, cap 9 may be omitted and the construction thereby cheapened; but it is preferable to employ both means, if for no other reason than to stimulate that caution on the part of the operative which is so essential when handling highly inflammable material.

I do not limit myself to the precise construction shown.

In Fig. 3, the numeral 30 represents a drain hole through the floors 8 and 19 for the purpose of carrying off any liquid which may accumulate in chamber 6. The wall 31, within chamber 13, guards this drain hole and prevents communication between it and the latter chamber.

What I claim is:—

A safety filling trap comprising a box having an upper wall with an opening therethrough and a lower wall with an opening therethrough; an interior partition wall for said box and interposed between said openings, said partition wall being itself provided with an opening; removable means for closing the partition wall opening from above; a valve seat for said partition wall opening and below the same; and a valve, housed within said box and adapted to automatically engage said seat and thus coöperate with said partition wall to prevent the rise of gases or fumes through said box.

In testimony whereof, I have affixed my signature, in presence of two witnesses.

CHARLES L. FRENCH.

Witnesses:
A. T. PALMER,
ARTHUR E. THAYER.